(12) United States Patent
Fiasconaro et al.

(10) Patent No.: US 12,534,288 B1
(45) Date of Patent: Jan. 27, 2026

(54) SHIPPING CONTAINER TRACKING ASSEMBLY, SYSTEM, AND METHOD OF MANUFACTURE

(71) Applicant: AKUA, Inc., Woodside, CA (US)

(72) Inventors: Richard Fiasconaro, Millsboro, DE (US); David Fiore, Little Elm, TX (US); Stephen Petz, Cheney, KS (US)

(73) Assignee: Akua, Inc., Woodside, CA (US)

( * ) Notice: Subject to any disclaimer, the term of this patent is extended or adjusted under 35 U.S.C. 154(b) by 0 days.

(21) Appl. No.: 18/782,283

(22) Filed: Jul. 24, 2024

(51) Int. Cl.
    *B65D 90/48* (2006.01)
    *B65D 90/34* (2006.01)
    *G06Q 10/0833* (2023.01)

(52) U.S. Cl.
    CPC ............ *B65D 90/48* (2013.01); *B65D 90/34* (2013.01); *G06Q 10/0833* (2013.01); *B65D 2590/0083* (2013.01)

(58) Field of Classification Search
    CPC ......... B65D 2590/0083; G06Q 10/833; G06Q 10/0833
    USPC .................. 705/333; 340/539.1; 343/771
    See application file for complete search history.

(56) References Cited

U.S. PATENT DOCUMENTS

| | | | |
|---|---|---|---|
| 7,317,387 B1* | 1/2008 | Cova ................... | B65D 90/008 340/539.1 |
| 10,240,339 B1* | 3/2019 | Dominguez ........ | E04B 1/34869 |
| 2005/0212671 A1* | 9/2005 | Auerbach .............. | G07C 11/00 340/539.1 |
| 2020/0280280 A1* | 9/2020 | Schelhaas ............... | H02S 40/38 |
| 2023/0252399 A1* | 8/2023 | Khoche ............. | G06Q 10/0833 705/333 |

* cited by examiner

*Primary Examiner* — Peguy Jean Pierre
(74) *Attorney, Agent, or Firm* — Esplin & Associates, PC (57) ABSTRACT

A shipping container tracking assembly, system, and method of manufacture are described herein. A shipping container tracking system may comprise one or more of a shipping container, a tracking assembly, and/or other components. A shipping container may have a frame holding walls to enclose a contained space. A first wall may have a wall vent with a ventilation passage therethrough. The tracking assembly may comprise one or more of a housing disposed within the contained space, electronic component(s) at least partially housed within the housing, an antenna, a conductor, and/or other components. The antenna may be mounted on the exterior side of the first wall. The conductor may electronically couple the antenna to at least one of the one or more electronic components through a conductor path defined, at least in part, through the ventilation passage.

16 Claims, 6 Drawing Sheets

SHIPPING CONTAINER TRACKING ASSEMBLY, SYSTEM, AND METHOD OF MANUFACTURE

FIELD OF THE DISCLOSURE

This disclosure relates to shipping container tracking devices and assemblies.

BACKGROUND

Cargo containers, such as ISO shipping containers (or simply "shipping container"), are the standard means for transporting products via trucks, boats and/or trains. Shipping containers are bound by international standards defined by the International Organization for Standardization ("ISO"). These standards include, among others, ISO 668 (related to classification, dimensions, and ratings), ISO 1496 (related to specification and testing), ISO 6346 (related to coding, identification, and marking), ISO 1161 (related to corner fittings), and ISO 3874 (related to handling and securing).

SUMMARY

Those who transport goods via shipping containers use tracking devices in order to track and send reports on the whereabouts of their containers during transit. A tracking device is typically secured on the outside of a shipping container to, or near, a hasp used to securely lock the doors of the shipping container. Often the tracking device is connected through cable lock, padlock, and/or other secure connection. Attachment to the outside of a shipping container is done for practical reasons. For example, the doors are typically already secured with tamper-proof locks at the hasp, so incorporating a tracking device to such a location also ensures some level of security with respect to the tracking device itself. Further, a tracking device may use one or more antennas to communicate with one or more base stations and/or satellites in order to perform its tracking and/or reporting functionality. Antennas may operate through transmission and/or reception of radio waves at one or more frequencies. It is traditionally understood that having the tracking device outside the shipping container is imperative because the shipping container would otherwise act as a large Faraday cage that would impede transmission and/or reception functionality of an antenna should the tracking device be mounted somewhere within a contained space of the shipping container.

Aspects of the present disclosure relate to a shipping container tracking system, tracking assembly, and methods of manufacture. The inventors have identified that the traditional techniques of securing a tracking device to the outside of a shipping container leaves the tracking device open to damage and tampering, regardless of the efforts taken to prevent this. There is an unmet need to integrate a shipping container with a tracking assembly which mounts one or more components of the assembly within a contained space of the shipping container, while still allowing an antenna to function as intended. The present disclosure proposes solution(s) that mount components of a tracking assembly within a contained space of a shipping container, while externally mounting an antenna, which can be incorporated (e.g., retrofitted) into existing shipping containers, as well as be made part of a shipping container during original manufacture thereof.

In some implementations, a shipping container tracking system may include one or more of a shipping container, a tracking assembly, and/or other components. A shipping container may have a frame holding walls to enclose a contained space, and/or other components. At least one wall may include at least one wall vent. A vent may include one or more ventilation passages. An individual ventilation passage may provide for fluid communication between an interior side of a wall and an exterior side of a wall. By way of non-limiting illustration, a first wall may have a wall vent with one or more ventilation passages therethrough.

The tracking assembly may include one or more of a housing, one or more electronic components, an antenna, a conductor, and/or other components. The housing may be disposed within the contained space of the container. The one or more electronic components may be at least partially housed within the housing. The antenna may be mounted on the exterior side of the first wall. The conductor may electronically couple the antenna to at least one of the one or more electronic components through a conductor path defined, at least part, through a ventilation passage of the wall vent.

Another aspect of the present disclosure relates to a method to modify a shipping container to include a tracking assembly with an externally mounted antenna. The method may comprise one or more of: mounting a housing of a tracking assembly to a frame of a shipping container within a contained space of the shipping container; mounting an antenna of the tracking assembly to an exterior side of a first wall of the shipping container; electronically coupling the antenna to at least one of the one or more electronic components; and/or or other operations.

Yet another aspect of the present disclosure relates to a method of manufacturing a shipping container tracking system. The method may comprise one or more of: forming a housing configured to house one or more electronic components of a tracking assembly; mounting the housing to a frame of a shipping container within a contained space of the shipping container; mounting an antenna of the tracking assembly to an exterior side of a first wall of the shipping container; electronically coupling the antenna to at least one of the one or more electronic components; and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
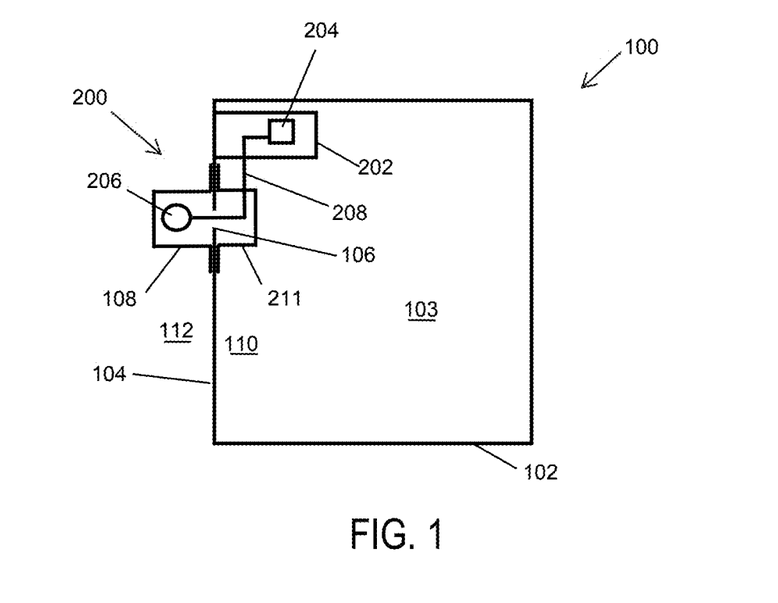
FIG. 1 illustrates a view of a shipping container tracking system, in accordance with one or more implementations.

FIG. 1 illustrates a block diagram view of a shipping container tracking system 100, in accordance with one or more implementations. In some implementations, a shipping container tracking system 100 may include one or more of a shipping container 102, a tracking assembly 200, and/or other components.

The shipping container 102 may comprise one or more of a frame, a set of walls, a ceiling, a floor, a door, and/or other components to enclose a contained space 103. The frame may comprise one or more of a set of posts, a set of top rails, a set of bottom rails, and/or other components. The shipping container 102 may be formed of materials and/or components typically used in the manufacture of shipping containers. By way of non-limiting illustration, the frame may be formed from steel beams and/or tubing. Individual walls, a floor, and/or a ceiling may comprise steel sheets/panels. Steel panels may be corrugated panels. The interior side of one or more walls, a floor, and/or a ceiling may include and/or may be covered in wood and/or other material paneling.

It is noted that one or more components of the system 100 described with respect to particular figures, but not necessarily labeled in individual figures, may later be described in further detail in this paper, and/or shown in further detail in one or more other figures using additional reference numeral labeling. Accordingly, the descriptions of component(s) accompanying references to particular figure(s), but without the use of reference numerals, is provided merely for the sake of brevity and should not be considered as limiting the scope or intent of the features and/or functionality attributed thereto. Further, the use of block diagram illustrations versus detailed illustrations of components in individual figures of this specification should also not be considered as limiting the scope or intent of the features and/or functionality attributed thereto.

At least one wall of the shipping container 102 may include at least one wall vent. An individual wall having an individual wall vent may include an individual exterior vent cover covering the individual wall vent at an exterior side of the individual wall. Individual wall vents may include individual sets of ventilation passages to provide for fluid communication between an interior side of an individual wall and an exterior side of the individual wall. Fluid communication may be provided so that air may passively flow through the vent, and/or so that the air may be freely exchanged between the ambient environment around a shipping container and the contained space of a shipping container. A shape, configuration, and/or location of a wall vent may be dictated by one or more ISO standards. In some implementations, a set of ventilation passages may include an array of ventilation passages. By way of non-limiting illustration, a set of ventilation passages may include a three-by-three square array of ventilation passages. A three-by-three array of ventilation passages is described for illustrative purposes only and not to be considered limiting.

By way of non-limiting illustration, as shown in FIG. 1, a first wall 104 may have a wall vent 106 with one or more ventilation passages therethrough. The wall vent 106 may include an exterior vent cover 108 covering the wall vent 106 at the exterior side 112 of the first wall 104. The interior side 110 may refer to an area, surface, and/or space that is within contained space 103. An exterior side 112 may refer to an area, surface, and/or space that is outside the contained space 103 and exposed to an ambient environment.

It is noted that terms such as "left," "right," "upper," "lower," "top," "bottom," "proximal," "distal," "front," "back," "side," "forward," "rearward," "inside," "outside," "interior," "exterior," "within," "inside," "outside," and/or other directional or positional terms herein may refer to conventional use of such terms as applied to conveying spatial orientation with respect to a shipping container (and/or other device having a frame and walls to enclose a contained space) that may become apparent to a person of ordinary skill in the art upon reading this disclosure. The use of these terms with various components should therefore be easily understood by a person skilled in the art as related to orientation, direction, and/or disposition. Further, directions may be specifically defined herein and/or shown in the figures. By way of non-limiting illustration, a front end of a shipping container may refer to an end having one or more doors permitting entrance into a contained space of the container.

In FIG. 1, the tracking assembly 200 may have one or more components that are dimensioned and arranged to be mounted to, and/or manufactured as part of, shipping container 102. Mounting may refer to attachment to or on a surface, structure, and/or other physical part. Attachment may be accomplished through techniques suitable for the intended purpose including, among others, mechanical fasteners (e.g., screws, nails, nut and bolt, rivet, etc.), welding, adhesive, and/or other techniques.

The tracking assembly 200 may include one or more of a housing 202, one or more electronic components 204, one or more antennas, one or more conductors, one or more interior vent covers, and/or other components. Antenna(s) may include one or more of a cellular antenna, a Global Navigation Satellite System (GNSS) antenna, a Global Positioning System (GPS) antenna, a satellite communications ("satcom") antenna, Global System for Mobile Communications (GSM) antenna, LTE antenna, 5G antenna, and/or other antenna(s) suitable for the purposes described herein and/or that would be apparent to a person having ordinary skill in the art. An antenna may comprise one or more of a wire antenna, a horn antenna, a reflector antenna, an array antenna, and/or other considerations. The antennas may include an antenna 206 and/or other antenna(s). In some implementations, antenna 206 in one or more of the figures may represent a set of multiple antennas. Accordingly, depiction(s) and/or corresponding descriptions referring to a single antenna 206 is for illustrative purposes only and is not to be considered limiting. The one or more conductors may include a conductor 208 and/or other conductor(s). In some implementations, conductor 208 in one or more of the figures may represent a set of multiple conductors. Accordingly, depiction(s) and/or corresponding descriptions referring to a single conductor 208 is for illustrative purposes only and is not to be considered limiting.

The housing 202 may be disposed within the contained space 103 of the shipping container 102. The housing 202 may cooperate with one or more walls and/or the frame of the shipping container 102 to house a volume inside the contained space 103. By way of non-limiting illustration, the housing 202 may comprise a box or other container suitable for housing a volume sized and dimensioned to house the various electronic components described herein. In some implementations, the housing 202 may be attached to the frame. The housing 202 may be attached to the frame in a recessed configuration so as to not protrude into contained space 103. In some implementations, the housing 202 may be attached to a top rail of the frame. The housing 202 may be formed from material suitable for the intended purpose, for example, metal, plastic, wood, and/or other materials.

The one or more electronic components 204 may be at least partially housed within the housing 202. An individual electronic component may be at least partially house by virtue of having at least part of the component mounted within a volume of the housing 202, while another part of the component may be mounted outside the volume within an ambient environment. In some implementations, one or more electronic components 204 may be at least partially housed within the housing 202 by virtue of one component being mounted within a volume of the housing 202 and another component being mounted outside the volume and exposed to an ambient environment. In some implementations, one or more electronic components 204 may be at least partially housed within the housing 202 by virtue of one component being mounted within a volume of the housing 202, and an other component being mounted such that a part of the other component is mounted within the volume of the housing 202, while another part of the other component is mounted outside the volume within an ambient environment.

Figure 2:
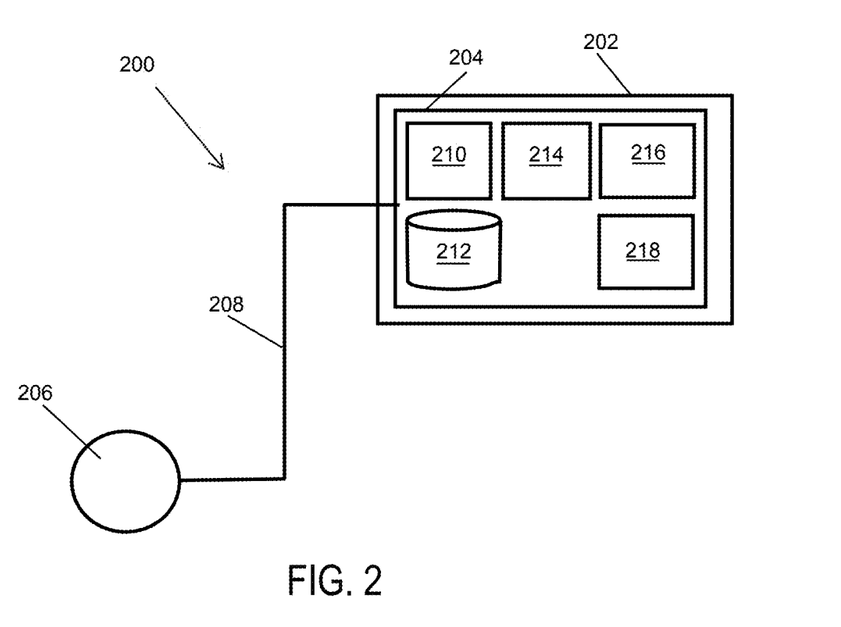
FIG. 2 illustrates a view of a tracking assembly of a shipping container tracking system, in accordance with one or more implementations.

Referring to the block diagram in FIG. 2 showing additional details of the tracking assembly 200, the one or more electronic components 204 may include one or more of one or more physical processors 210, non-transitory electronic storage 212, a Global System for Mobile Communications (GSM) device 214, a Global Positioning System (GPS) device 216, a battery 218, and/or other components. Individual antennas typically included in individual ones of the GSM device 214 and/or GPS device 216 may instead be disposed outside of the housing 202 and included as part of antenna 206 and/or other antenna(s) configured to be mounted on an exterior side of a wall.

The one or more physical processors 210 may be configured by machine-readable instructions that, when executed by the one or more physical processors 210 causes the one or more physical processors 210 to facilitate location tracking of the tracking assembly 200 (and a shipping container by virtue of being mounted to the shipping container) and/or reporting of the location. Tracking of the tracking assembly 200 may be achieved by determining physical location of the tracking assembly 200 as a function of time. The physical location of the tracking assembly 200 may be determined as a function of time through continuous or periodic communication of the tracking assembly 200 with a remote station and/or satellite. Reporting of location including communicating with a base station and/or satellite which relays location to a client device of a user (not shown in FIG. 2).

An individual antenna may be mounted on an exterior side of an individual wall having an individual wall vent. The mounting on an exterior side may include one or more of attachment on an exterior surface of a wall, an attachment within a space between the exterior surface of the wall and an exterior vent cover, and/or other exterior side mounting configuration. These configurations may express a departure from current approaches where a tracking assembly in its entirety is mounted on an exterior side of a shipping container, typically near the closure mechanism used to close and lock a door. The configuration(s) described and shown herein may allow an antenna to function without interference from the shipping container itself, since the metal walls would otherwise create interference with radio communication capabilities of an internally mounted antenna.

In some implementations, an individual antenna may be mounted near an individual wall vent. In this context, "near" may mean within distance from a ventilation passage used to pass a conductor through. In some implementations, the distance may be in the range of one to ten centimeters. In some implementations, the distance may be greater than ten centimeters. In some implementations, the distance may become apparent to a person of ordinary skill in the art in order to achieve the features and/or functions described herein. By way of non-limiting illustration, the distance may be dictated by the space between an exterior surface of a wall and an exterior vent cover, which itself may be readily discernible by a person having ordinary skill in the art upon even a cursory investigation of the external vent cover.

An individual interior vent cover may be configured to be mounted on an interior side of an individual wall having an individual wall vent. An individual interior vent cover may cover the interior side of the ventilation passage(s) of an individual wall vent without impeding any fluid communication therethrough. By way of non-limiting illustration, an individual vent cover may include cover ventilation passage (s) that individually align with, and/or are complementary to, individual ventilation passage(s) of the individual wall vent. In some implementations, an individual interior vent cover may further be configured to cover one or more portions of an individual conductor that attaches an individual antenna to an electronic component.

By way of non-limiting illustration, referring back to FIG. 1, the antenna 206 may be mounted on the exterior side 112 of the first wall 104. In some implementations, the antenna 206 may be attached to an exterior surface (not shown in FIG. 1) of the first wall 104. In some implementations, the antenna 206 may be disposed in a space between the exterior surface of the first wall 104 and the exterior vent cover 108.

In some implementations, the tracking assembly 200 may include an interior vent cover 211 for the wall vent 106. The interior vent cover 211 may comprise one or more cover ventilation passages. The cover ventilation passage(s) may be formed and/or arranged such that attachment over the interior side of the wall vent 106 may cause the individual cover ventilation passage to align with individual ventilation passage of the wall vent 106 so as to not impede the fluid communication therethrough.

An individual conductor of the tracking assembly 200 may electronically couple an individual antenna to at least one of the one or more electronic components. The individual conductor may be electronically coupled so that the individual antenna may electrically communicate information (e.g., location information, reporting information, and/or other information) with the at least one of the one or more electronic components. By way of non-limiting illustration, an individual conductor may comprise an individual wire, multiple wires forming a telecommunications cable, and/or other components. In some implementations, a portion of an individual conductor may be routed through a top rail of a frame of the shipping container 102. The top rail through which the individual conductor is routed may be adjacent to another top rail to which the housing 202 may be mounted. In some implementations, a portion of an individual conductor may be routed through a ventilation passage of a wall vent.

The description of routing of a conductor may refer to a conductor path, e.g., the path a conductor follows (e.g., is routed through) in order to achieve the features and/or functionality described herein. Accordingly, in some implementations, a conductor path may be formed through one or more of a portion of a frame of a shipping container (e.g., a top rail adjacent to another top rail where a housing is mounted), a ventilation passage, a wall of a housing (e.g., to electrically connect to an electronic component housed therein), and/or other areas and/or parts of a shipping container and/or tracking assembly.

In some implementations, the tracking assembly 200 may comprise a portion electrical conduit that forms part of a conductor path (not shown in FIG. 1 or 2). The electrical conduit may serve to protect a conductor within a shipping container as well as clearly define a conductor path.

Figures 3, 4, 5:
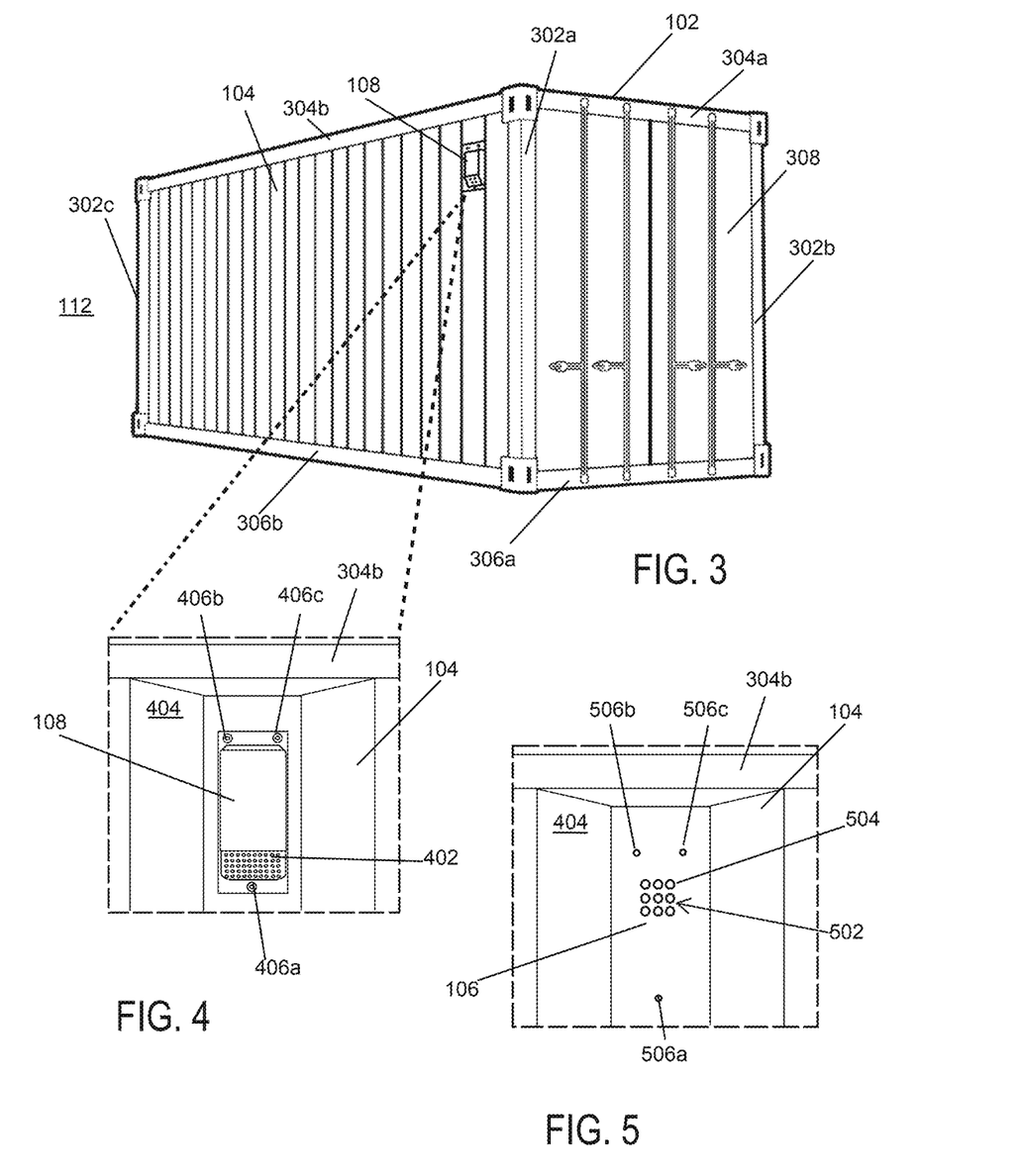
FIG. 3 illustrates a view of a shipping container, in accordance with one or more implementations.
FIG. 4 illustrates a close-up view of a portion of an exterior side of a wall of a shipping container showing an exterior vent cover of a wall vent, in accordance with one or more implementations.
FIG. 5 illustrates a close-up view of a portion of an exterior side of a wall of a shipping container showing an exterior side of a wall vent with an exterior vent cover removed, in accordance with one or more implementations.

FIG. 3 illustrates a three-dimensional view of the shipping container 102, in accordance with one or more implementations. It is to be understood that although the view in FIG. 3 only depicts and labels some portions of the shipping container 102, this is for illustrative purposes only and not to be considered limiting. Instead, other portions of the shipping container 102 not currently visible in the depiction of FIG. 3 but would be known or apparent to a person having ordinary skill in the art still comprise part of the present disclosure even if they are not explicitly shown in the figure.

The shipping container 102 may comprise one or more of a frame (e.g., 302a-c, 304a-b, and 306a-b), a set of walls (e.g., first wall 104 and/or other walls), a ceiling (not shown in FIG. 3), a floor (not shown in FIG. 3), a door 308, and/or other components to enclose a contained space 103. Although only the first wall 104 is depicted and labeled in FIG. 3, this is for illustrative purposes only and not to be considered limiting, as the shipping container 102 may include additional walls not currently visible in the depiction of FIG. 3 but would be apparent to a person having ordinary skill in the art. For example, the set of walls may include the first wall 104, as well as additional walls not currently shown, such as a second wall opposite the first wall 104 and a third wall opposite the door 308.

The frame may comprise one or more of a set of posts 302a-c, a set of top rails 304a-b, a set of bottom rails 306a-b, and/or other components. Posts may generally refer to upright or vertical posts when considering a shipping container in its ordinary course of use and construction. Top rails may refer to structural elements that connect to the top of uppermost part of the posts and may serve as a basis to attach a ceiling. Bottom rails may refer to structural elements that connect to the bottom of lower most part of the posts and may serve as a basis to attach a floor.

Although three posts, two top rails, and two bottom rails are depicted and labeled in FIG. 3, this is for illustrative purposes only and not to be considered limiting, as the shipping container 102 may include additional frame components not currently visible in the depiction of FIG. 3 but would be apparent to a person having ordinary skill in the art. For example, the set of posts may include those labeled as well as a fourth post not currently shown, located at a corner opposite of post 302a. Further, the set of top rails may include those labeled as well as a third and a fourth top rail not currently shown, but located opposite each of the labeled top rails 304a-b. Furthermore, the set of bottom rails may include those labeled as well as a third and a fourth bottom rail not currently shown, but located opposite each of the labeled bottom rails 306a-b.

The shipping container 102 as shown in FIG. 3 depicts walls formed of corrugated panels, shaped with parallel ridges and grooves. The first wall 104 may have a wall vent (not shown in FIG. 3) with one or more ventilation passages therethrough. The wall vent may include the exterior vent cover 108 covering the wall vent at the exterior side 112 of the first wall 104. The exterior side 112 may refer to an area, surface, and/or space that is outside a contained space of the shipping container 102 and exposed to an ambient environment. It is noted that the location and/or arrangement of the wall vent and subsequently the exterior vent cover 108 may differ than what is depicted in FIG. 3. Instead, FIG. 3 is provided for illustrative purposes to depict a likely, if not typical, location of a wall vent/exterior wall cover.

FIG. 4 illustrates a close-up view of a portion of an exterior side 112 of the first wall 104 of the shipping container 12, showing the exterior vent cover 108 in more detail, in accordance with one or more implementations. FIG. 4 depicts a typical as-used mode of an exterior vent cover.

The exterior vent cover 108 may cooperate with first wall 104 to define a space between the exterior surface 404 and the exterior vent cover 108. By way of non-limiting illustration, the exterior vent cover 108 may comprise a partial container including a set of walls sized and dimensioned to fit over the wall vent 106 (see FIG. 5). In some implementations, the exterior vent cover 108 may be attached to the exterior surface 404 so as to cover the wall vent. The exterior surface 404 may be attached to exterior surface 404 using one or more fasteners 406a-c, such as a set of nuts and bolts, which communicate through the first wall 104 via fastener passages (not shown in FIG. 4). The exterior vent cover 108 may include a set of cover ventilation passages 402 communicating through at least one wall of the exterior vent cover 108.

FIG. 5 illustrates a close-up view of a portion of an exterior side of a wall (e.g., the first wall 104) of the shipping container 102, with the exterior vent cover 108 removed so that the wall vent 106 is exposed, in accordance with one or more implementations. The wall vent 106 may include a set of ventilation passages 502 to provide for fluid communication between an interior side of the first wall 104 and an exterior side of the first wall 104. Fluid communication may be provided so that air may passively flow through the wall vent 106, so that the air may be exchanged between the ambient environment around a shipping container and the contained space of a shipping container. By way of non-limiting illustration, the set of ventilation passages 502 may include a three-by-three square array of ventilation passages. A shape, configuration, and/or location of a wall vent, and/or the shape, configuration, location, and/or amount of ventilation passages may be dictated by one or more ISO standards. Accordingly, the depiction in FIG. 5 is for illustrative purposes only. In some implementations, the set of ventilation passages 502 may include an array of ventilation passages. The wall vent 106 may further include a set of fastener passages 506*a-c* that correspond to the fasteners 406*a-c* used to secure the exterior vent cover 108 to the exterior surface 404. For illustrative purposes, a first ventilation passage 504 is labeled and may be referred to herein.

Figure 6:
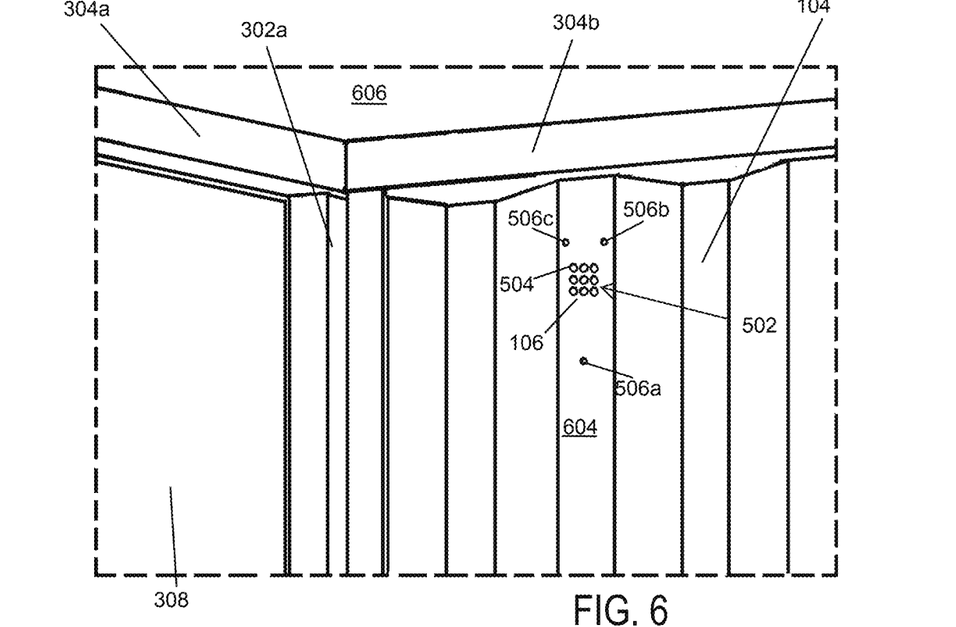
FIG. 6 illustrates a close-up view of a portion of an interior side of a wall of a shipping container showing a wall vent, in accordance with one or more implementations.

FIG. 6 illustrates a close-up view of a portion of an interior side of a wall (e.g., first wall 104) of a shipping container (e.g., shipping container 102) showing a wall vent (e.g., wall vent 106), in accordance with one or more implementations. The view of FIG. 6 depicts the first wall 104, a first top rail 304*a*, a second top rail 304*b* adjacent the first top rail 304*a*, a ceiling 606 of the shipping container 102, the door 308, and/or other components of shipping container from within the contained space. Other components may include, for example, a door frame and/or other support posts and/or rails. As shown, the set of ventilation passages 502 may communicate through the first wall 104 and open up into the contained space of the shipping container at an interior surface 604 of the first wall 104. The set of fastener passages 506*a-c* may communicate through the first wall 104 and open up into the contained space of the shipping container at an interior surface 604 of the first wall 104.

Figure 7:
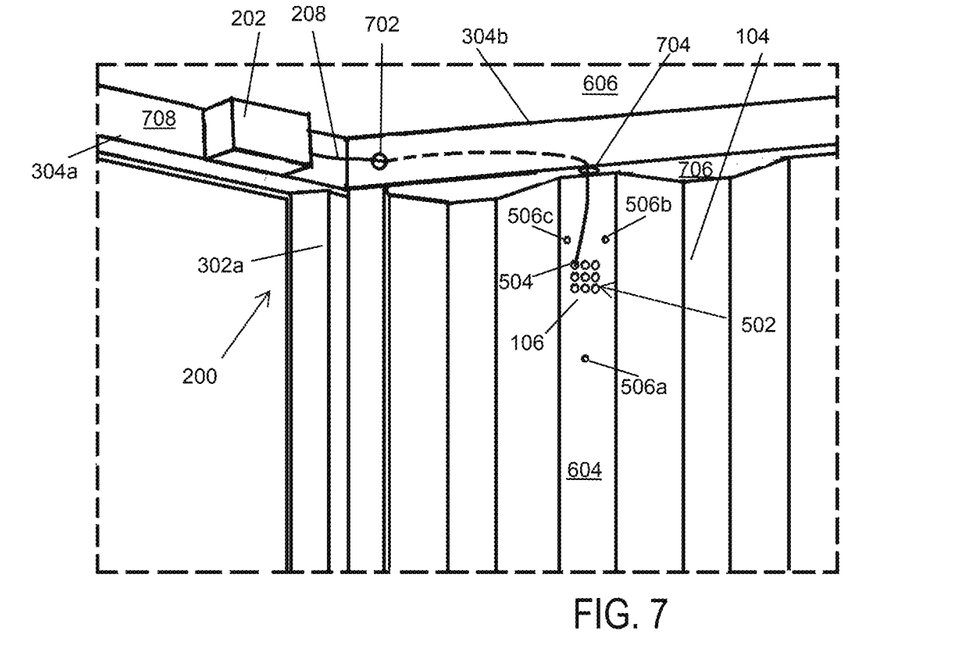
FIG. 7 illustrates a close-up view of a portion of an interior side of a wall of a shipping container adapted to include a tracking assembly that cooperates with a frame of the shipping container and a wall vent, in accordance with one or more implementations.

FIG. 7 illustrates a close-up view of a portion of an interior side of a wall (e.g., first wall 104) of a shipping container (e.g., shipping container 102) of FIG. 6, showing the shipping container adapted/modified to include a tracking assembly (e.g., tracking assembly 200) that cooperates with a frame of the shipping container and a wall vent (e.g., wall vent 106), in accordance with one or more implementations.

In some implementations, modifying the shipping container to include the tracking assembly 200 may include mounting the housing 202 of the tracking assembly 200 to the frame. The housing 202 may be mounted to a portion of the frame where the housing 202 may be out of the way. In particular, the housing 202 may be mounted to a surface 708 of the first top rail 304*a*. The surface upon which the housing 202 is mounted may include an interior vertical face of the first top rail 304*a* and/or other surface. It is noted, however, in some implementations the housing 202 may be mounted on another portion of the frame and/or to a portion of a wall. Further, in some implementations, housing 202 may be recessed into the first top rail 304*a* so that the housing 202 may be flush, or near flush, with the surface 708. Recessing into the first top rail 304*a* may include cutting a shape into the first top rail 304*a* that is the same as or similar to the shape of housing 202.

In some implementations, modifying the shipping container to include the tracking assembly 200 may include establishing a conductor path for the conductor 208 of the tracking assembly 200. The conductor path may be established, at least in part, by identifying a path through which the conductor 208 may be positioned (routed, fed, laid, and/or secured) so as to achieve a connection between electronic component(s) housed within the housing 202 and an antenna (not shown) mounted on an exterior side of the shipping container. In some implementations, in order to keep the conductor 208 out of the visible contained space within the shipping container as much as possible (e.g., to avoid snags by cargo being loaded into the contained space), a solution is proposed which includes routing at least a portion of the conductor 202 through the frame. For example, the conductor 202 may be routed through a portion of second top rail 304*b*. For illustrative purposes, a portion of the conductor 208 that passes through the portion of the second top rail 304*b* is shown in dashed lines in FIGS. 7 and 8. However, in use, that portion of the conductor 208 would not be visible to a user standing in the contained space and looking up toward the second top rail 304*b*.

In some implementations, routing through the portion of the second top rail 304*b* may be achieved by forming a first passage 702 into a surface of second top rail 304*b* near a location where the housing 202 is mounted on first top rail 304*a*. A person of ordinary skill in the art will appreciate that "near" may include a distance that is practical in order to achieve the features and/or functionality described herein. The first passage 702 may be formed, for example, by drilling a hole through a wall of the second top rail 304*b*. That is, it is common for rails that form part of a frame of a shipping container to comprise steel tubes or pipes. Accordingly, a solution described herein may take advantage of a hollow space within a rail to route the conductor 208. Routing through the portion of the second top rail 304*b* may be achieved by forming a second passage 704 into a surface 706 of second top rail 304*b* near a location of the wall vent 106. Again, a person of ordinary skill in the art will appreciate that "near" may include a distance that is practical in order to achieve the features and/or functionality described herein. The second passage 706 may be formed, for example, by drilling a hole through a wall of the second top rail 304*b*. In some implementations, the housing 202 may be mounted to the first top rail 304*a* so that a side of the housing 202 abuts the second top rail 304*b*. In such a configuration, a portion of the conductor 208 exposed within the contained space between the housing 202 and the first passage 702 may be minimized or eliminated altogether.

In some implementations, surface 706 of second top rail 304*b* may be adjacent to an interior surface 604 of the first wall 104 where the wall vent 106 is located. By way of non-limiting illustration, surface 706 may comprise a surface of second top rail 304*b* that is orthogonal to the interior surface 604 of the first wall 104.

The conductor path may further be defined as passing through one of the ventilation passages of the set of ventilation passages 502. By way of non-limiting illustration, the first ventilation passage 504 may serve as part of the conductor path through which the conductor 208 is routed. Once routed through the first ventilation passage 504, an antenna may be attached to an end of the conductor 208, and the antenna mounted on an exterior side of the first wall 104 (see, e.g., FIG. 10).

Figure 8:
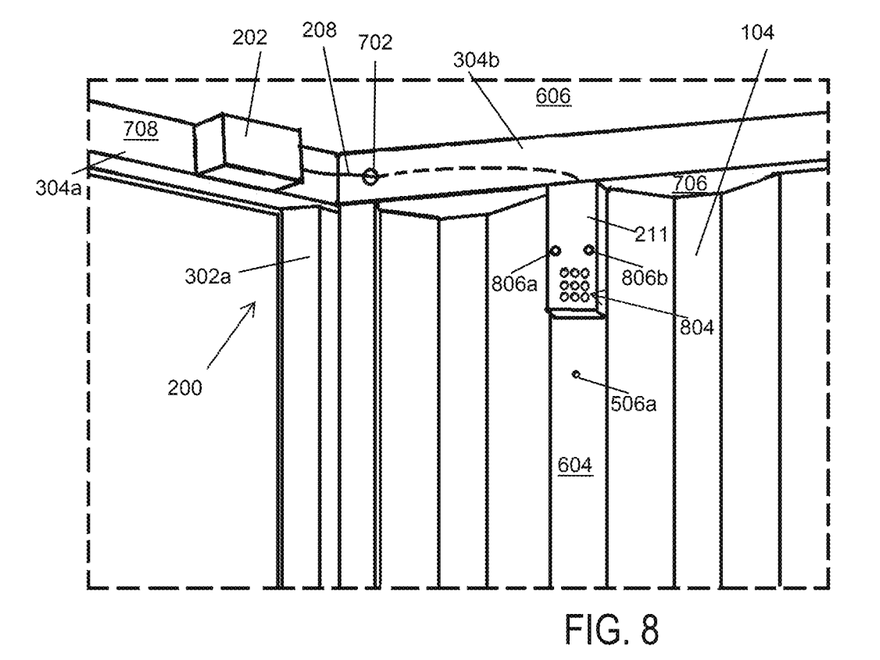
FIG. 8 illustrates a close-up view of a portion of an interior side of a wall of a shipping container adapted to include a tracking assembly with an interior vent cover, in accordance with one or more implementations.

FIG. 8 illustrates a close-up view of a portion of an interior side of a wall (e.g., first wall 104) of a shipping container (e.g., shipping container 102), showing the shipping container adapted/modified to include a tracking assembly (e.g., tracking assembly 200), and further including an interior vent cover (e.g., interior vent cover 211), in accordance with one or more implementations. The interior vent cover 211 may be shaped and dimensioned to cooperate with the interior surface 604 of the first wall 104 to form cover the wall vent (not labeled in FIG. 8 because it is mostly covered; see, e.g., wall vent 106 in FIG. 7).

The interior vent cover 211 may comprise a set of cover ventilation passages 804. The set of cover ventilation passages 804 may be formed and arrange such that attachment over the wall vent may cause the set of cover ventilation passages 804 to cooperate and align with the ventilation passages (see, e.g., set of ventilation passages 502 in FIG. 7) of the wall vent.

The interior vent cover 211 may include a set of complementary fasteners passages 806a-b that, when covering the wall vent, align and cooperate with one or more of the fastener passages that form part of the wall vent (see, e.g., fastener passage 506b and 506c in FIG. 7). In this manner, hardware fasteners (not shown in FIG. 8) that are the same as or similar to OEM fasteners used to secure the exterior vent cover (see, e.g., exterior vent cover 108 in FIG. 4) may be similarly used to attach the interior vent cover 211 to the interior surface 604 and over the wall vent. In some implementations, fasteners longer than OEM fasteners may be used in order to accommodate dimensions of interior vent cover 211.

Figure 9:
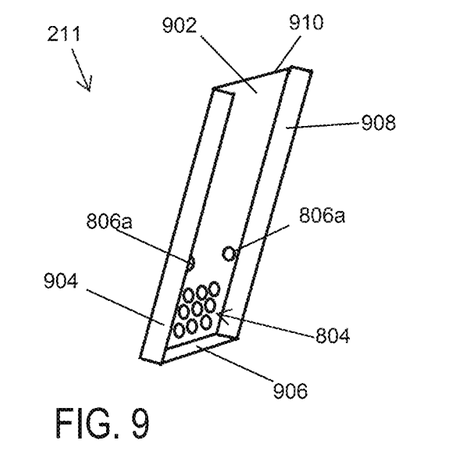
FIG. 9 illustrates an interior vent cover, in accordance with one or more implementations.

FIG. 9 illustrates a detailed view of the interior vent cover 211, in accordance with one or more implementations. The interior vent cover 211 may comprise a closure, or partial enclosure, which, when attached to an interior surface over a wall vent in an as-used mode encloses a space between the interior vent cover 211 and the interior surface. The space enclosed by the interior vent cover 211 in the as-used mode may be large enough to accommodate at least a portion of a conductor that passes through a ventilation passage of the wall vent into the contained space of the shipping container, and extends from the ventilation passage to a passage that leads to a hallow space of a top rail (see, e.g., the portion of conductor 208 that extends from ventilation passage 504 to the second passage 704 in FIG. 7).

The interior vent cover 211 may have a body formed by one or more of a first wall 902, a second wall 904, a third wall 906, a fourth wall 908, and/or other components. The first wall 902 may form a front face of the interior vent cover 211. The second wall 904 may form a side wall. The fourth wall 908 may form another side wall. The second wall 904 may be opposite the fourth wall 908. The third wall 906 may form a bottom wall. The interior vent cover 211 may have an open end 910, so that there may be no wall opposite the third wall 906 (e.g., there is no top wall). In the as-used mode, the interior vent cover 211 may be positioned such that the open end 910 abuts a surface of a top rail (see, e.g., surface 706 in FIG. 8), thereby closing the otherwise open end 910 with the surface of the top rail acting as a top wall. The interior vent cover 211 may be formed from material suitable for the intended purpose, for example, metal, plastic, wood, and/or other materials.

Figure 10:
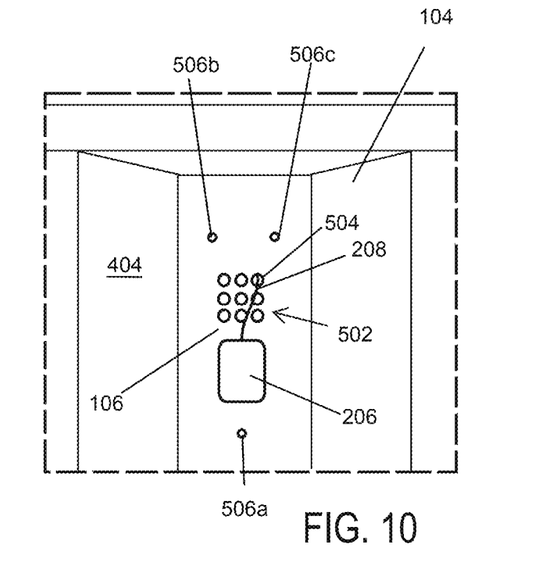
FIG. 10 illustrates a close-up view of a portion of an exterior side of a wall of a shipping container adapted to include a tracking assembly, showing an exterior side of a wall vent with an exterior vent cover removed and an antenna attached to an exterior surface of the wall, in accordance with one or more implementations.

FIG. 10 illustrates a close-up view of a portion of an exterior side of a wall (e.g., the first wall 104) of a shipping container, with the exterior vent cover removed so that the wall vent (e.g., wall vent 106) is exposed, showing an antenna (e.g., antenna 206) mounted to an exterior side of the wall, in accordance with one or more implementations. The mounting on an exterior side may include one or more of attachment on an exterior surface 404 of the wall, an attachment within a space between the exterior surface 404 of the wall and an exterior vent cover, and/or other exterior side mounting configuration. The antenna 206 may be attached near the set of ventilation passages 502. Near may refer to a location that is 1-5 centimeters away from the set of ventilation passages 502, and/or other location that is suitable for the intended purpose described herein. Near may refer to a location greater than 5 centimeters away from the set of ventilation passages 502, and/or other location that is suitable for the intended purpose described herein. Attachment of antenna 206 may utilize mechanical fasteners, adhesive, magnets, and/or other attachment techniques.

In some implementations, attachment within a space between the exterior surface 404 of the wall and an exterior vent cover other than on the exterior surface 404 itself may include attachment of antenna 206 to an interior surface of a wall of the exterior vent cover (see, e.g., exterior vent cover 108 in FIG. 4). It is intended that an attachment of antenna 206 within a space between the exterior surface 404 of the wall and an exterior vent cover would not impede the external vent cover's ability to secure to the exterior side of the wall and cover the wall vent 106 from the exterior side.

Once antenna 206 is mounted on the exterior side of the first wall 104, an exterior vent cover may be reattached to the exterior surface 404 of the first wall 104. It is anticipated that the exterior side of the first wall 104 with the exterior vent cover attached would look the same or similar to the view of FIG. 4. That is, the presence of antenna within the space between the exterior surface 404 of the wall and an exterior vent cover would not be readily known upon simply viewing the external vent cover from the exterior side.

Figure 11:
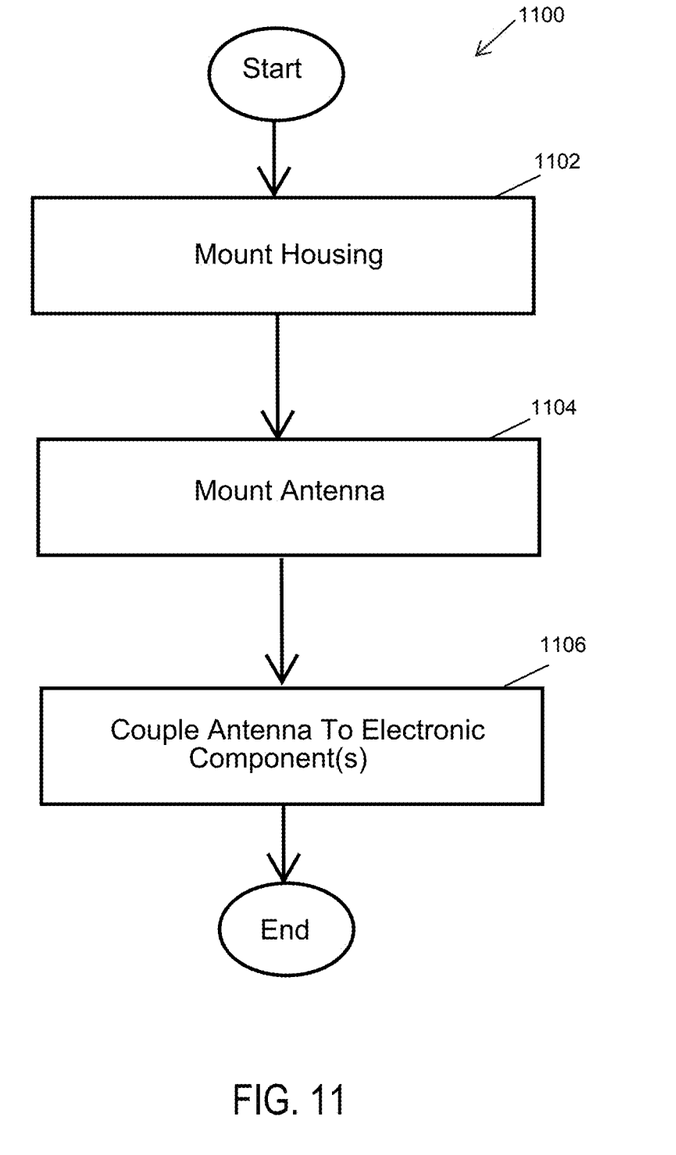
FIG. 11 illustrates a method to modify a shipping container to include a tracking assembly with an externally mounted antenna, in accordance with one or more operations.

FIG. 11 illustrates a method 1100 to modify a shipping container to include a tracking assembly with an externally mounted antenna, in accordance with one or more implementations. The operations of method 1100 presented below are intended to be illustrative. In some implementations, method 1100 may be accomplished with one or more additional operations not described, and/or without one or more of the operations discussed. Additionally, the order in which the operations of method 1100 are illustrated in FIG. 11 and described below is not intended to be limiting.

In some implementations, method 1100 may be implemented using manual and/or automated manufacturing techniques. A manufacturing techniques may include one or more techniques used by skilled artisans. Manufacturing techniques may include fabrication techniques and/or assembly techniques. Such techniques may include one or more of cutting, casting, extruding, grinding, bending, forging, stamping, turning, additive manufacturing, powder metallurgy, injection molding, compression molding, drilling, riveting, screwing, welding, sanding, and/or other techniques. Other techniques known to skilled artisans are also within the scope of the present disclosure. An automated manufacturing technique may include machine(s). By way of non-limiting illustration, a machine may include one or more of a CNC machine, CNC lathe, and/or other machines. A machine may include one or more processing devices, non-transitory electronic storage, and/or other components. The one or more processing devices and/or machines may include one or more devices executing some or all of the operations of method 1100 in response to instructions stored electronically on electronic storage medium. The one or more processing devices and/or machines may include one or more devices configured through hardware, firmware, and/or software to be specifically designed for execution of one or more of the operations of method 1100.

An operation 1102 may include mounting a housing of a tracking assembly to a frame of a shipping container within a contained space of the shipping container. The housing may be configured to house one or more electronic components of the tracking assembly. The tracking assembly may be the same as or similar to tracking assembly 200, as shown in the figures and described herein. The housing may be the same as or similar to housing 202, as shown in the figures and described herein. The shipping container may be the same as or similar to shipping container 102, as shown in the figures and described herein.

An operation 1104 may include mounting an antenna of the tracking assembly to an exterior side of a wall of the shipping container. The wall may have a wall vent with a ventilation passage therethrough. The ventilation passage may provide fluid communication between an interior side of the wall and the exterior side of the wall. The antenna may be the same as or similar to antenna 206, as shown in the figures and described herein. The wall may be the same as or similar to first wall 104, as shown in the figures and described herein. The ventilation passage may be the same as or similar to first ventilation passage 504, as shown in the figures and described herein.

An operation 1106 may include electronically coupling the antenna to at least one of the one or more electronic components. The electronic coupling may be achieved through a conductor that is the same as or similar to conductor 208, as shown in the figures and described herein.

Figure 12:
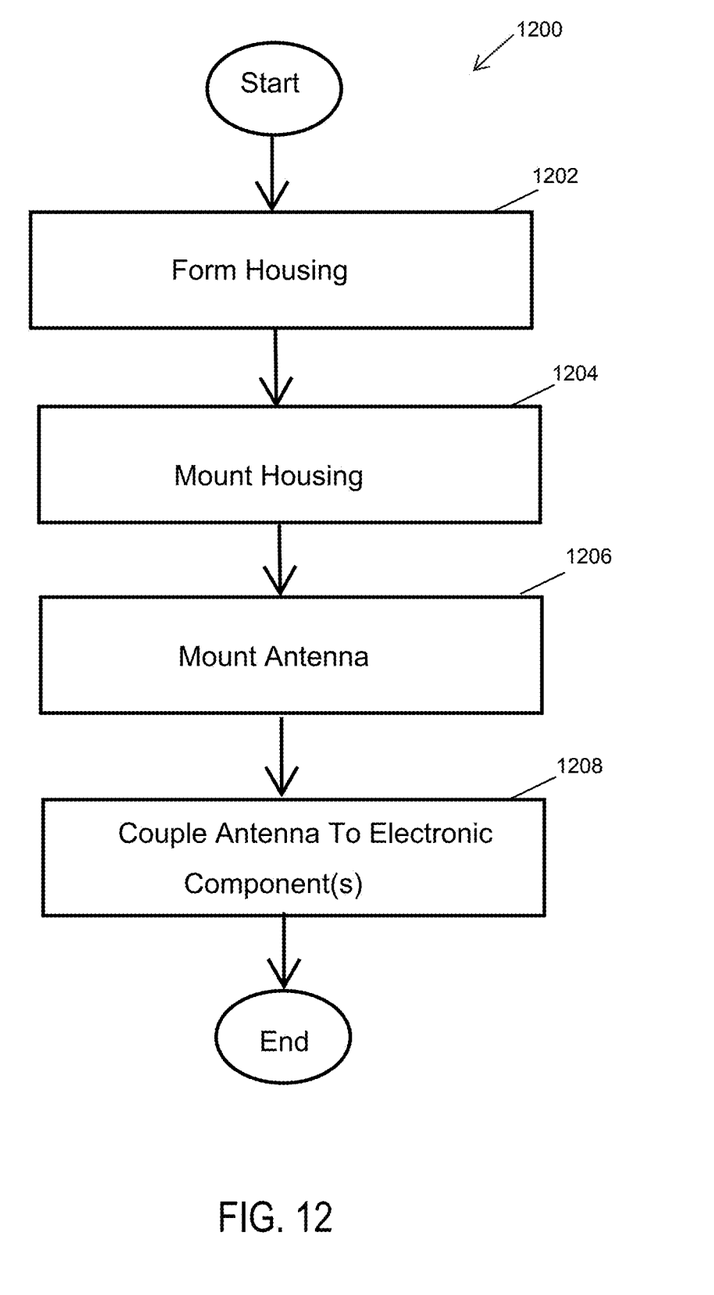
FIG. 12 illustrates a method of manufacturing a shipping container tracking system, in accordance with one or more implementations.

FIG. 12 illustrates a method 1200 of manufacturing a shipping container tracking system, in accordance with one or more implementations. The operations of method 1200 presented below are intended to be illustrative. In some implementations, method 1200 may be accomplished with one or more additional operations not described, and/or without one or more of the operations discussed. Additionally, the order in which the operations of method 1200 are illustrated in FIG. 12 and described below is not intended to be limiting.

In some implementations, method 1200 may be implemented using manual and/or automated manufacturing techniques described herein and/or that may be apparent to a person having ordinary skill in the art.

An operation 1202 may include forming a housing configured to house one or more electronic components of a tracking assembly. The housing may be the same as or similar to housing 202, as shown in the figures and described herein. The tracking assembly may be the same as or similar to tracking assembly 200, as shown in the figures and described herein.

An operation 1204 may include mounting the housing to a frame of a shipping container within a contained space of the shipping container. The shipping container may be the same as or similar to shipping container 102, as shown in the figures and described herein.

An operation 1206 may include mounting an antenna of the tracking assembly to an exterior side of a wall of the shipping container. The wall may have a wall vent with a ventilation passage therethrough. The ventilation passage may provide fluid communication between an interior side of the wall and the exterior side of the wall. The antenna may be the same as or similar to antenna 206, as shown in the figures and described herein. The wall may be the same as or similar to first wall 104, as shown in the figures and described herein. The ventilation passage may be the same as or similar to first ventilation passage 504, as shown in the figures and described herein.

An operation 1208 may include electronically coupling the antenna to at least one of the one or more electronic components. The coupling may be achieved through a conductor that is the same as or similar to conductor 208, as shown in the figures and described herein. The coupling may comprise passing a conductor through the wall via the ventilation passage.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A shipping container tracking system comprising:
   a shipping container, the shipping container having;
      walls;
      a door;
      a door frame supporting the door; and
      a frame, the frame comprising a set of posts, a set of top rails, and a set of bottom rails, the frame holding the walls to enclose a contained space; and
      wherein the walls include a first wall having a wall vent with a ventilation passage therethrough, wherein the ventilation passage provides fluid communication between an interior side of the first wall and an exterior side of the first wall;
   a tracking assembly comprising:
      a housing disposed within the contained space;
      one or more electronic components at least partially housed within the housing;
      an antenna mounted on the exterior side of the first wall outside of the shipping container and between an exterior surface of the first wall and an exterior vent cover; and
      a conductor, the conductor electronically coupling the antenna to at least one of the one or more electronic components through a conductor path;
   wherein the housing is attached to the frame within the shipping container adjacent to the wall vent; and
   wherein the one or more electronic components at least partially housed within the housing within the shipping container include a Global System for Mobile Communications (GSM) device, a Global Positioning System (GPS) device, and a battery.

2. The system of claim 1, wherein the tracking assembly further comprises an interior vent cover, the interior vent cover having a cover ventilation passage that aligns with the ventilation passage of the wall vent.

3. The system of claim 1, wherein the conductor passes through the first wall via the ventilation passage to electronically couple the antenna to the at least one of the one or more electronic components.

4. The system of claim 1, wherein the housing is recessed into the frame.

5. The system of claim 1, wherein the housing is attached to a top rail of the frame.

6. The system of claim 5, wherein a portion of the conductor disposed within the shipping container is routed through an adjacent top rail of the frame.

7. The system of claim 6, further comprising a conduit defining at least part of the conductor path, the conductor path being formed at least in part through the frame.

8. The system of claim 1, wherein the ventilation passage provides the fluid communication by allowing air to passively flow through the wall vent so that the air is freely exchanged between an ambient environment around the shipping container and the contained space of the shipping container.

9. The system of claim 1, wherein the housing includes a set of housing walls coupled together to define a volume within the contained space.

10. The system of claim 9, wherein the one or more electronic components are at least partially housed within the housing by virtue of at least one electronic component being mounted within the volume of the housing.

11. The system of claim 1, wherein the conductor electronically couples the antenna to the at least one of the one or more electronic components to facilitate the exchange of information between the antenna and the at least one of the one or more electronic components.

12. A method to modify a shipping container to include a tracking assembly with an externally mounted antenna, the shipping container having walls, a door, a door frame supporting the door, and a frame, the frame comprising a set of posts, a set of top rails, and a set of bottom rails, the frame holding the walls to enclose a contained space, the method comprising:
  mounting a housing of the tracking assembly to the frame of the shipping container within the contained space of the shipping container and adjacent to a wall vent of a first wall of the shipping container, the housing being configured to house one or more electronic components of the tracking assembly;
  mounting an antenna of the tracking assembly to an exterior side of the first wall of the shipping container outside of the shipping container and between an exterior surface of the first wall and an exterior vent cover, the first wall having the wall vent with a ventilation passage therethrough, wherein the ventilation passage provides fluid communication between an interior side of the first wall and the exterior side of the first wall;
  electronically coupling the antenna to at least one of the one or more electronic components through a conductor path; and
  wherein the one or more electronic components are at least partially housed within the housing within the shipping container, the one or more electronic components including a Global System for Mobile Communications (GSM) device, a Global Positioning System (GPS) device, and a battery.

13. The method of claim 12, wherein the mounting the housing to the frame comprises attaching the housing to a top rail.

14. The method of claim 12, wherein the electronically coupling the antenna to the at least one of the one or more electronic components comprises:
  passing a conductor through the first wall via the ventilation passage.

15. A method of manufacturing a shipping container tracking system, the method comprising:
  forming a housing configured to house one or more electronic components of a tracking assembly;
  mounting the housing to a frame of a shipping container within a contained space of the shipping container and adjacent to a wall vent of a first wall, the shipping container having walls including the first wall, a door, a door frame supporting the door, and the frame, the frame comprising a set of posts, a set of top rails, and a set of bottom rails, the frame holding the walls to enclose the contained space;
  mounting an antenna of the tracking assembly to an exterior side of the first wall of the shipping container outside of the shipping container and between an exterior surface of the first wall and an exterior vent cover, the first wall having a wall vent with a ventilation passage therethrough, wherein the ventilation passage provides fluid communication between an interior side of the first wall and the exterior side of the first wall;
  electronically coupling the antenna to at least one of the one or more electronic components; and
  wherein the one or more electronic components are at least partially housed within the housing within the shipping container, the one or more electronic components including a Global System for Mobile Communications (GSM) device, a Global Positioning System (GPS) device, and a battery.

16. The method of claim 15, further comprising passing a conductor through the first wall via the ventilation passage.

* * * * *